United States Patent Office.

J. B. PATTERSON, OF PORTAGE CITY, WISCONSIN.

Letters Patent No. 81,104, dated August 18, 1868.

IMPROVED COMPOUND FOR PRESERVING EGGS.

*The Schedule referred to in these Letters Patent and making part of the same.*

TO ALL WHOM IT MAY CONCERN:

Be it known that I, J. B. PATTERSON, of Portage City, in the county of Portage, and State of Wisconsin, have invented a new and useful Compound for Preserving Eggs; and I do hereby declare that the following is a full and complete description of the same. I take—

Thirty gallons of water.

One pound concentrated solution of potash, or the equivalent of this, in any other form.

One pound sal-soda.

One-half pound of sugar or other saccharine equivalent.

One pint of vinegar, or its equivalent of acetic acid of the same strength.

One-half pint of oil, lard-oil preferred.

I take the solutions of potash, sal-soda, and sugar, and dissolve them in warm water, to which I then add the vinegar, then stir it until the whole is combined. I then mix this with the thirty gallons of water, and when cold it is ready for use.

The compound is placed in a proper vessel, and the eggs are then carefully placed in it. The amount of material above specified is sufficient, if put in a suitable vessel, for three hundred dozen eggs.

The eggs should be covered with the compound, which has a greater density than water. It may be well first to allow the composition to settle before using it, and then draw it off into the vessels in which the eggs are placed.

The foregoing are the relative proportions used, but which may be varied a little without injuring their preserving quality, and may be used in large or small quantities, according to the number of eggs to be preserved.

The eggs should be allowed to remain in the composition for some ten or twenty days, then taken out for use, or laid in a box or barrel in the usual way for shipping, and will remain, thus treated, fresh and good for many months, if kept in a cool place.

What I claim as my invention, and desire to secure by Letters Patent, is—

The herein-described compound, composed of the ingredients substantially as set forth, for the purpose specified.

J. B. PATTERSON.

Witnesses:
   W. H. BURRIDGE,
   K. COON.